United States Patent
Weber et al.

(10) Patent No.: US 12,249,898 B2
(45) Date of Patent: Mar. 11, 2025

(54) COOLANT SUPPLY SYSTEM FOR AN ELECTRICALLY OPERATED VEHICLE AXLE

(71) Applicant: AUDI AG, Ingolstadt (DE)

(72) Inventors: Andreas Weber, Ingolstadt (DE); Ivo Greiter, Eitensheim (DE); Harald Gloede, Pförring (DE); Herbert Tschentscher, Riedenburg (DE); Frank Roethlingshoefer, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/699,966

(22) PCT Filed: Jul. 27, 2022

(86) PCT No.: PCT/EP2022/071064
§ 371 (c)(1),
(2) Date: Apr. 10, 2024

(87) PCT Pub. No.: WO2023/072445
PCT Pub. Date: May 4, 2023

(65) Prior Publication Data
US 2024/0333102 A1   Oct. 3, 2024

(30) Foreign Application Priority Data
Oct. 28, 2021   (DE) ............... 10 2021 128 067.2

(51) Int. Cl.
*H02K 9/19* (2006.01)
*B60K 11/02* (2006.01)
(Continued)

(52) U.S. Cl.
CPC ............... *H02K 9/19* (2013.01); *B60K 11/02* (2013.01); *H02K 7/116* (2013.01); *H02K 9/193* (2013.01)

(58) Field of Classification Search
CPC .......... H02K 9/19; H02K 9/193; H02K 9/197; H02K 7/116; H02K 1/32; H02K 2213/03; B60K 11/02
(Continued)

(56) References Cited

U.S. PATENT DOCUMENTS

| | | | |
|---|---|---|---|
| 2011/0285221 A1 | 11/2011 | Chamberlin et al. | |
| 2013/0043747 A1* | 2/2013 | Kubes | H02K 5/203 29/596 |

(Continued)

FOREIGN PATENT DOCUMENTS

| | | |
|---|---|---|
| CA | 2116900 A1 | 9/1995 |
| CN | 109997296 A | 7/2019 |

(Continued)

OTHER PUBLICATIONS

International Preliminary Report on Patentability issued on Jan. 30, 2024, in corresponding International Application No. PCT/EP2022/071064, 36 pages.

(Continued)

Primary Examiner — Alexander A Singh
(74) Attorney, Agent, or Firm — Maier & Maier, PLLC

(57) ABSTRACT

A coolant supply system for a drive device of an electrically operated vehicle axle with an electric machine which has a cylindrical stator housing, in which there is a winding head space axially on both sides of a rotor/stator arrangement, at the bottom of which coolant collects. The two winding head spaces are fluidly connected to one another via a coolant sump, and the stator housing height and the coolant sump height in the electric machine vertical direction add up to a total height. In order to reduce the total height, the coolant sump is offset by a transverse offset from a rotor axis vertical plane. In this way, the stator housing height and the coolant (Continued)

sump height can at least partially overlap in the vertical direction of the electric machine by an overlap amount.

13 Claims, 4 Drawing Sheets

(51) Int. Cl.
*H02K 7/116* (2006.01)
*H02K 9/193* (2006.01)

(58) Field of Classification Search
USPC .......................................................... 310/54
See application file for complete search history.

(56) References Cited

U.S. PATENT DOCUMENTS

| | | |
|---|---|---|
| 2014/0265658 A1 | 9/2014 | Sten et al. |
| 2019/0052146 A1* | 2/2019 | Decaux .................... H02K 9/19 |
| 2021/0159761 A1* | 5/2021 | Dumas ..................... H02K 9/19 |

FOREIGN PATENT DOCUMENTS

| | | |
|---|---|---|
| CN | 112271876 A | 1/2021 |
| DE | 2139740 A1 | 3/1973 |
| DE | 102008040691 A1 | 2/2010 |
| DE | 102011084031 A1 | 4/2013 |
| DE | 102011055192 A1 | 5/2013 |
| DE | 112011103349 T5 | 7/2013 |
| DE | 102017201117 A1 | 7/2018 |
| DE | 102019114611 A1 | 4/2020 |
| DE | 102019114476 A1 | 12/2020 |
| EP | 3411941 B1 | 1/2020 |
| WO | 2015174212 A1 | 11/2015 |

OTHER PUBLICATIONS

International Search Report issued on Nov. 18, 2022, in corresponding International Application No. PCT/EP2022/071064, 6 pages.
Examination Report issued on May 31, 2022, in corresponding German Application No. 102021128067.2, 12 pages.

* cited by examiner

Section B

Section C

COOLANT SUPPLY SYSTEM FOR AN ELECTRICALLY OPERATED VEHICLE AXLE

FIELD

The invention relates to a coolant supply system for a drive device of an electrically operated vehicle axle of a two-track vehicle.

BACKGROUND

In the case of an electrically operated, two-track vehicle, an electrically driven vehicle axle can, for example, have an electric machine. This can be arranged axially parallel to the flange shafts guided to the vehicle wheels. In this case, the electric machine can drive via a single or double spur gear stage an axle differential and further the flange shafts of the vehicle axle that are guided to the vehicle wheels.

Such an electric machine can be implemented as a wet-running electric machine that has a cylindrical stator housing. A stator/rotor arrangement is installed in the stator housing. Axially on both sides of the stator/rotor arrangement there is a winding head space, at the bottom of which coolant collects and drains into a coolant sump. The two winding spaces are fluidly connected to one another via the coolant sump.

In the prior art, the coolant sump is arranged centrally in vertical alignment below the rotor axis at the lowest point. The coolant sump extends essentially over the entire axial length of the stator housing. Such a stator housing geometry is problematic with regard to package optimization, since the stator housing height and the coolant sump height add up to a comparatively large total height. Reducing the total height by reducing the coolant sump flow cross section is not possible in view of the coolant sump functionality. In addition, such a reduction in the coolant sump flow cross section is not easily feasible from a manufacturing (i.e. casting) perspective.

From DE 10 2019 114 476 A1 an oil pan with a two-part collecting space is known. An oil pan for an engine is known from DE 2 139 740 A. A transmission oil chamber is known from DE 10 2008 040 691 A1.

CN 112 271 876 A discloses a coolant supply system. DE 11 2011 103349 T5 discloses a coolant discharge system and a method for an electric machine. EP 3 411 941 B1 discloses a cooling device for an electric machine. CN 109 997 296 A discloses a rotor, an electric machine and a method for manufacturing a rotor. CA 2 116 900 A1 discloses a generic coolant supply system.

The object of the invention is to provide a coolant supply system for a drive device of an electrically operated vehicle axle of a two-track vehicle, which has a reduced installation space requirement in the vertical direction of the electric machine compared to the prior art.

The invention is based on a coolant supply system for a drive device of an electrically operated vehicle axle of a two-track vehicle. The drive device has a wet-running electric machine. A rotor/stator arrangement is installed in a cylindrical stator housing of the electric machine. There is a winding head space on both sides of this rotor/stator arrangement. Coolant collects at the bottom and drains into a coolant sump. The two winding spaces are fluidly connected to one another via the coolant sump. According to the characterizing part of claim 1, the total height of the electric machine is reduced as follows: the coolant sump is positioned offset by a transverse offset from a rotor axis vertical plane. In this way, the stator housing height and the coolant sump height can at least partially overlap in the vertical direction of the electric machine by an overlap amount. Compared to the prior art, the total height of the electric machine is reduced by the overlap amount.

The coolant sump can extend continuously in the stator housing axial direction over the entire stator housing axial length. In addition, the coolant sump is designed as follows with regard to different driving operating conditions, for example accelerating, cornering, uphill or downhill driving: the coolant sump is divided according to the invention into two slosh channels. These are each arranged with a transverse offset on both sides of the rotor axis vertical plane.

The electric machine is installed according to the invention transversely, parallel to the vehicle axle. In this case, in particular, a first suction point can be positioned on a left side of the vehicle, while a second suction point can be positioned on the right side of the vehicle. When the vehicle corners to the left, the coolant in the coolant sump (or in the slosh channels) shifts towards the right suction point due to centrifugal force. On the contrary, when the vehicle corners to the right, the coolant in the coolant sump (or in the slosh channels) shifts towards the left suction point due to centrifugal force. Therefore, when cornering, the coolant can be safely returned to the coolant tank either from the first suction point or from the second suction point.

The two slosh channels also ensure reliable coolant circulation when the vehicle is driving uphill or downhill. When driving uphill, the rear slosh channel in the direction of travel ensures a fluid connection between the winding head spaces. When driving downhill, the front slosh channel in the direction of travel ensures a fluid connection between the winding head spaces.

In this case, the electric machine can drive via a single or double spur gear stage an axle differential and further the flange shafts of the vehicle axle that are guided to the vehicle wheels. In this case, it is preferred if the coolant supply system additionally has a transmission hydraulic circuit. The coolant tank, the transmission interior and a transmission sump formed on the transmission bottom can be integrated into the transmission hydraulic circuit. In the transmission sump, the coolant draining from transmission components is collected at a transmission suction point and from there returned to the coolant tank by means of a transmission return pump. The transmission can be flanged directly to one of the stator housing axial sides of the electric machine, so that the stator housing is axially extended with the transmission housing.

In a preferred embodiment variant, an end wall of the stator housing close to the transmission can have a coolant passage. This connects the winding head space close to the transmission with the transmission sump. The coolant passage can, for example, be positioned aligned vertically to the rotor axis. In this case, the transmission-side suction point can have a dual function, not only returning the coolant that collects in the transmission sump to the coolant tank, but also sucking the coolant that is transferred from the stator housing sump.

In view of a perfect fluidic connection between the two axially spaced winding head spaces, it is preferred if the sloshing channels are each connected to the respective winding head space at coolant passages. In addition, it is preferred if at least one of the two sloshing channels is connected to the transmission sump via a channel opening.

In a particularly preferred embodiment variant, the two suction points can be positioned in a diagonal arrangement described below. In this case, the transmission-side suction point can be positioned together with the sloshing channel formed with the channel opening on a common side with respect to the rotor axis vertical plane. In contrast, the suction point remote from the transmission and the slosh channel not connected to the transmission sump can be arranged on the opposite side of the rotor axis vertical plane. Preferably, each of the two suction points can be associated with its own electric machine return pump. In a space-saving embodiment variant, the return pumps can be arranged on a common stator housing axial side, in particular together with the transmission. The suction point arranged on the stator housing axial side remote from the pump or transmission can in this case be connected to an electric machine return pump via a return line. The stator housing can be realized as a cast part, on which the sloshing channels as well as the return line and the later described transverse channel are formed in material connection and in one piece. The return line and the two slosh channels can extend axially parallel to the rotor axis.

A transverse channel can be formed on one of the stator housing axial sides, in particular on the stator housing axial side remote from the transmission. The two slosh channels and preferably the return line open into the transverse channel. The transverse channel can establish a flow connection between the two sloshing channels and the winding head space.

For this purpose, the transverse channel is connected to the winding head space at a coolant passage. In a dual function, the transverse channel can not only provide a flow connection, but also act as a receiving space in which a sieve element can be used that filters the coolant flowing through.

Also according to the invention is a coolant supply system for a drive device of an electrically operated vehicle axle with an electric machine, which has a cylindrical stator housing in which a winding head space is located axially on both sides of a rotor/stator arrangement, at the bottom of which coolant collects, wherein the two winding head chambers are fluidly connected to one another via a coolant sump, and wherein the stator housing height and the coolant sump height in the electric machine vertical direction add up to a total height, and wherein in order to reduce the total height the coolant sump is offset by a transverse offset from a rotor axis vertical plane, so that the stator housing height and the coolant sump height overlap at least partially in the electric machine vertical direction by an overlap amount, wherein an electric machine hydraulic circuit is provided in which the coolant sump is integrated, from which coolant can be returned to a coolant tank at suction points by means of at least one return pump. In accordance with the invention, a transverse channel is formed on an axial side of the stator housing, into which two slosh channels open, the transverse channel connecting the two slosh channels to one another.

BRIEF DESCRIPTION OF THE FIGURES

An exemplary embodiment of the invention is described below by means of the appended figures.

In the figures.

BRIEF DESCRIPTION OF THE FIGURES

Figure 1:
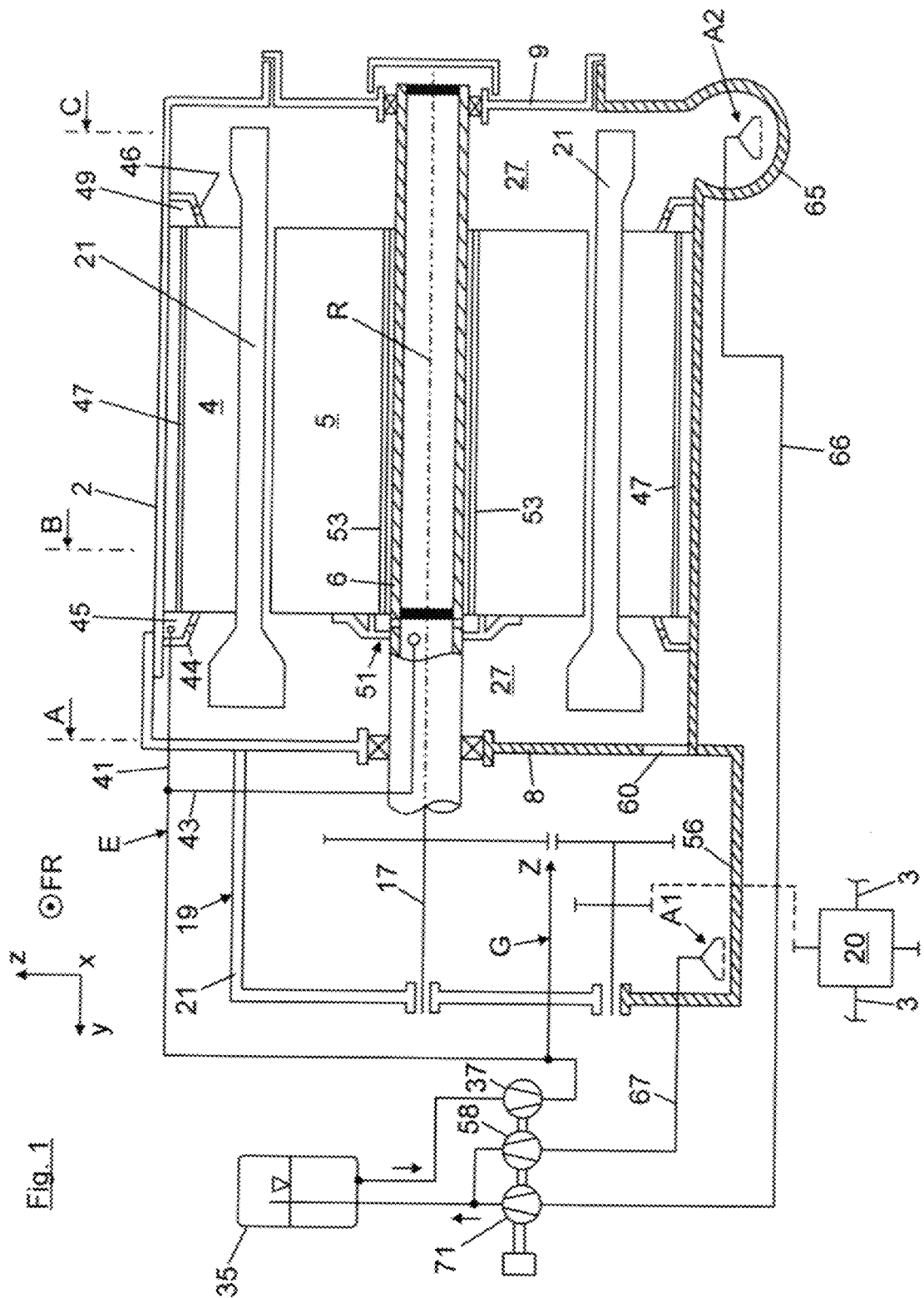
FIG. 1 shows a roughly schematic sectional view of the electric machine with an associated coolant supply system.

FIG. 1 shows a drive device for a vehicle axle of a two-track vehicle. The drive device has an electric machine which, when installed transversely, is arranged axially parallel to the flange shafts 3 guided to the vehicle wheels. A stator 4 with a rotor 5 interacting therewith is arranged in a stator housing 2 of the electric machine. The rotor shaft 6 is rotatably mounted in bearing openings on axially opposite housing walls 8, 9 of the stator housing 2. The rotor shaft 6 of the electric machine is connected in a rotationally fixed manner to a transmission input shaft 17 of a transmission 19, for example via a spline. In FIG. 1, the transmission 19 is realized as a two-stage spur gear that drives an axle differential 20. In FIG. 1, the axle differential 20 is positioned outside a transmission housing 21 for reasons of clarity. In fact, the axle differential 20 can be positioned within the transmission housing 21 together with the two-stage spur gear.

In FIG. 1, the stator 4 has a plurality of stator windings, of which only two stator windings 21 are roughly indicated in FIG. 1. Each stator winding 21 has a winding head on both axial sides, which projects into a winding head space 27. Each winding head space 27 is integrated into an electric machine hydraulic circuit E described later, with the help of which the respective winding head space 27 can be supplied with coolant in order to cool the winding heads of the stator 4. In each of the winding head spaces 27, a coolant/air mixture moves in a vortex flow around the rotor shaft 5, which rotates at high speed.

As shown in FIG. 1, the electric machine hydraulic circuit E has a coolant tank 35, which is connected to a suction pump 37 via a suction line. A pressure line leads from the suction pump 37 to coolant supply lines 41, 43. By means of the supply line 41, coolant is fed into a radially outer circumferential annular gap 45. From there, the coolant is guided via radially outer stator channels 47 to a further annular gap 49 in the right winding head space 27. The two annular gaps 45, 47 are separated from the respective winding head space 27 via splash rings 44. Each of the splash rings 44 has nozzles 46 distributed in the circumferential direction, via which coolant (i.e. oil) can be injected into the respective winding head space 27.

By means of the supply line 43, coolant is guided through the rotor shaft 6 and passed via a flow connection 51 into radially inner stator channels 53 into the right winding head space 27. In addition, coolant is projected radially outwards towards the winding heads starting from the flow connection 51 and starting from the right mouth opening of the radially inner stator channels 53.

The two winding head spaces 27 are separated from one another in a substantially coolant-tight manner in the interior of the stator housing via the stator/rotor arrangement. In order to provide a flow connection between the winding head spaces 27, two sloshing channels 54, 55 (FIG. 2) are provided, which extend on the outside of the stator housing in the axial direction over the entire axial length of the stator housing. To reduce the total height $h_{tot}$, each of the two sloshing channels 54, 55 is arranged offset from a rotor axis vertical plane V in FIG. 2 with a transverse offset $\Delta x$. In this way, the stator housing height $h_1$ partially overlaps with the slosh channel height $h_2$ in the electric machine vertical direction z by an overlap amount $\Delta z$. The total height $h_{tot}$ is therefore reduced by the overlap amount $\Delta z$.

In FIG. 1, the transmission 19 is flanged to the left stator housing axial side. An interior of the transmission 19 and a transmission sump 56 formed on the transmission bottom are integrated into a transmission hydraulic circuit G. In the transmission hydraulic circuit G, the coolant draining from transmission components collects at a transmission-side suction point A1. The transmission-side suction point A1 is connected via a return line 67 to a transmission return pump 58, which returns coolant into the coolant tank 35. In addition, a coolant passage 60 is formed in the housing end wall 8 of the stator housing 2 close to the transmission. This connects the winding head space 27 close to the transmission with the transmission sump 56. The coolant passage 60 is positioned in vertical alignment with the rotor axis R in FIG. 1 or 2. In addition, the rear sloshing channel 55 in the direction of travel FR is in direct fluidic connection with the transmission sump 56 via a channel opening 61 (FIG. 2), while the front sloshing channel 54 relative to the direction of travel FR has no direct connection to the transmission sump 56. The two slosh channels 54, 55 are also connected to the winding head space 27 near the transmission at coolant passages 48, 50 in FIG. 2.

As already mentioned, in FIG. 1 the electric machine is installed transversely parallel to the vehicle axle. In FIG. 1, the transmission-side suction point A1 is positioned on the left side of the vehicle, while a transmission-remote suction point A2 is positioned on the right side of the vehicle. When the vehicle curves to the left, the coolant is displaced via the sloshing channels 54, 55 towards the right suction point A2 due to centrifugal force. In contrast, when the vehicle curves to the right, the coolant is displaced via the sloshing channels 54, 55 towards the left suction point A1 due to centrifugal force. Therefore, when cornering, the coolant can be reliably returned to the coolant tank 35 either via the left suction point A1 or via the right suction point A2.

Figure 4:
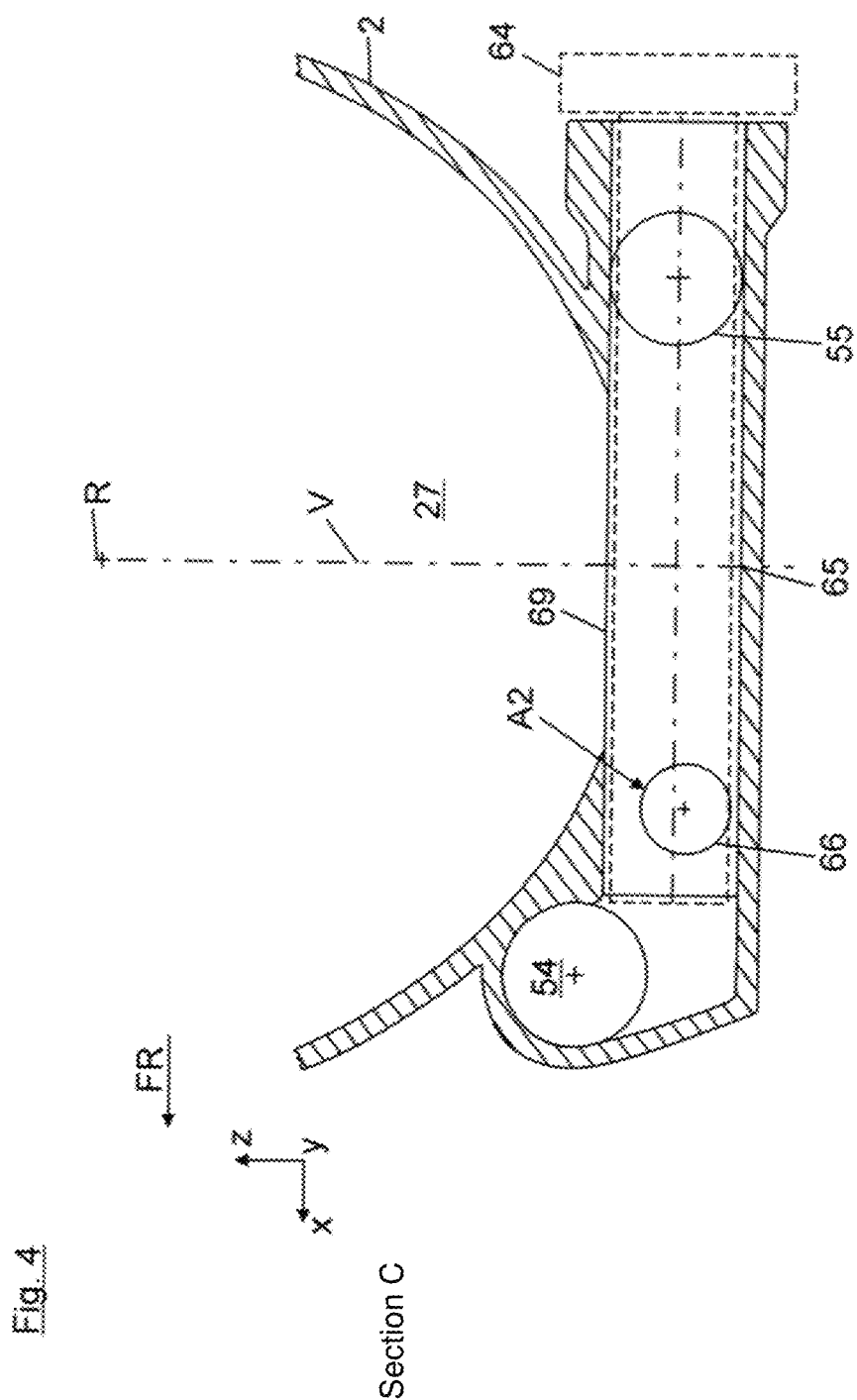
FIG. 4 shows a sectional view of the electric machine.

On the stator housing axial side remote from the transmission, a transverse channel 65 is formed on the stator housing base in FIG. 4, into which the two slosh channels 54, 55 and the later described return line 66 open. The transverse channel 65 establishes a flow connection between the two slosh channels 54, 55 and the winding head space 27 remote from the transmission. For this purpose, the transverse channel 65 is connected to the winding head space 27 remote from the transmission at a coolant passage 69. A sieve element 64 can also be inserted into the transverse channel 65, which element filters the coolant flowing through.

In FIG. 1, the suction pump 37, the transmission return pump 58 and an electric machine return pump 71 are components of a multiple pump (combination pump). With such a multiple pump, the individual pumps are driven by a common drive shaft. The common drive shaft is in turn connected to an electric motor that acts as a drive. In FIG. 1, all pumps 37, 58, 71 are positioned on the left axial side of the stator housing in a space-saving manner. The suction point A2 arranged on the stator housing axial side remote from the pump is connected to the electric machine return pump 71 via the return line 66. The return line 66 is aligned axially parallel to the two sloshing channels 54, 55 in the figures. The stator housing 2 can preferably be realized as a cast part, on which both the two sloshing channels 54, 55 and the return line 66 are formed in one piece using the same material.

Figure 2:
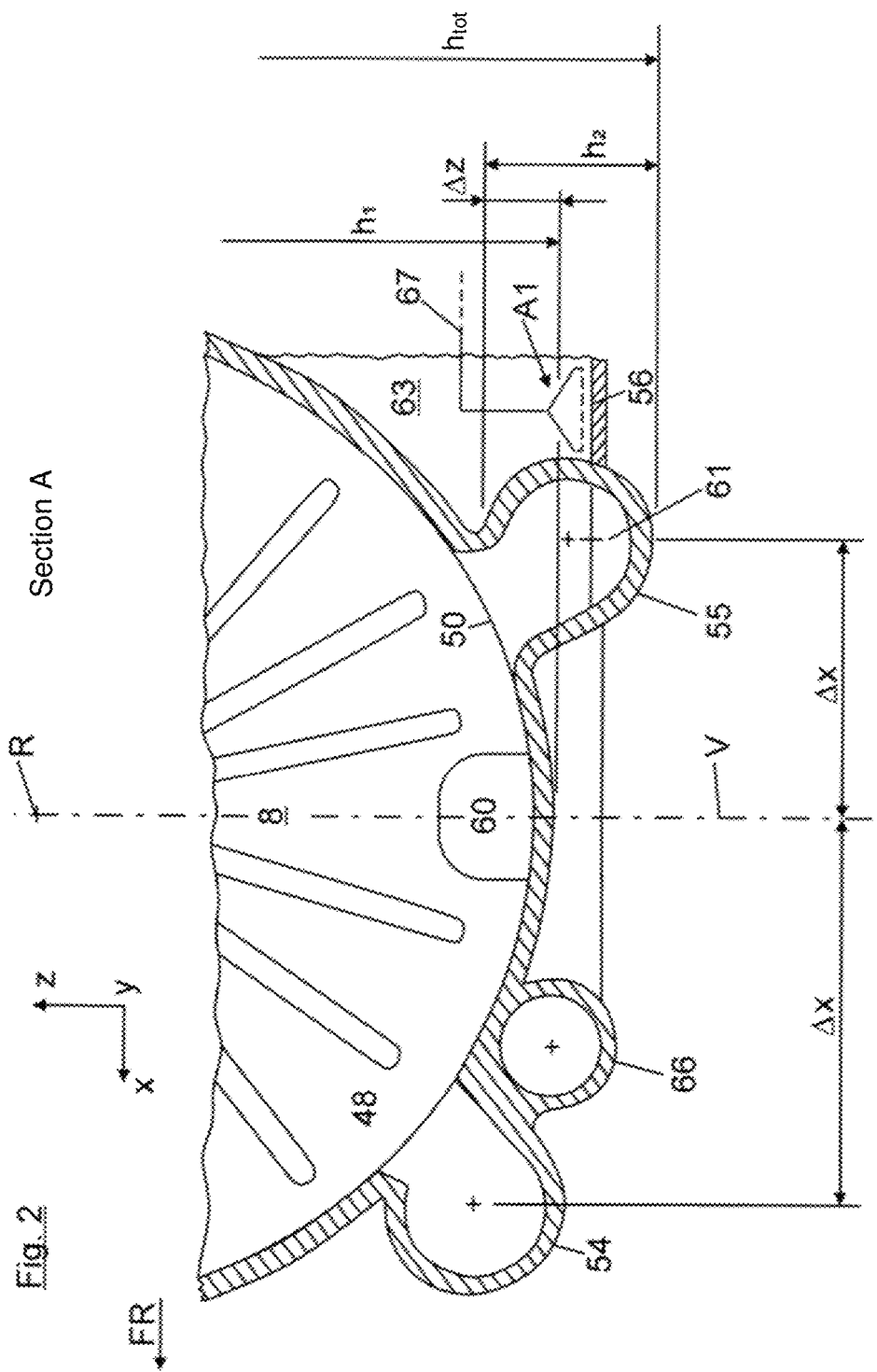
FIG. 2 shows a sectional view of the electric machine.
Figure 3:
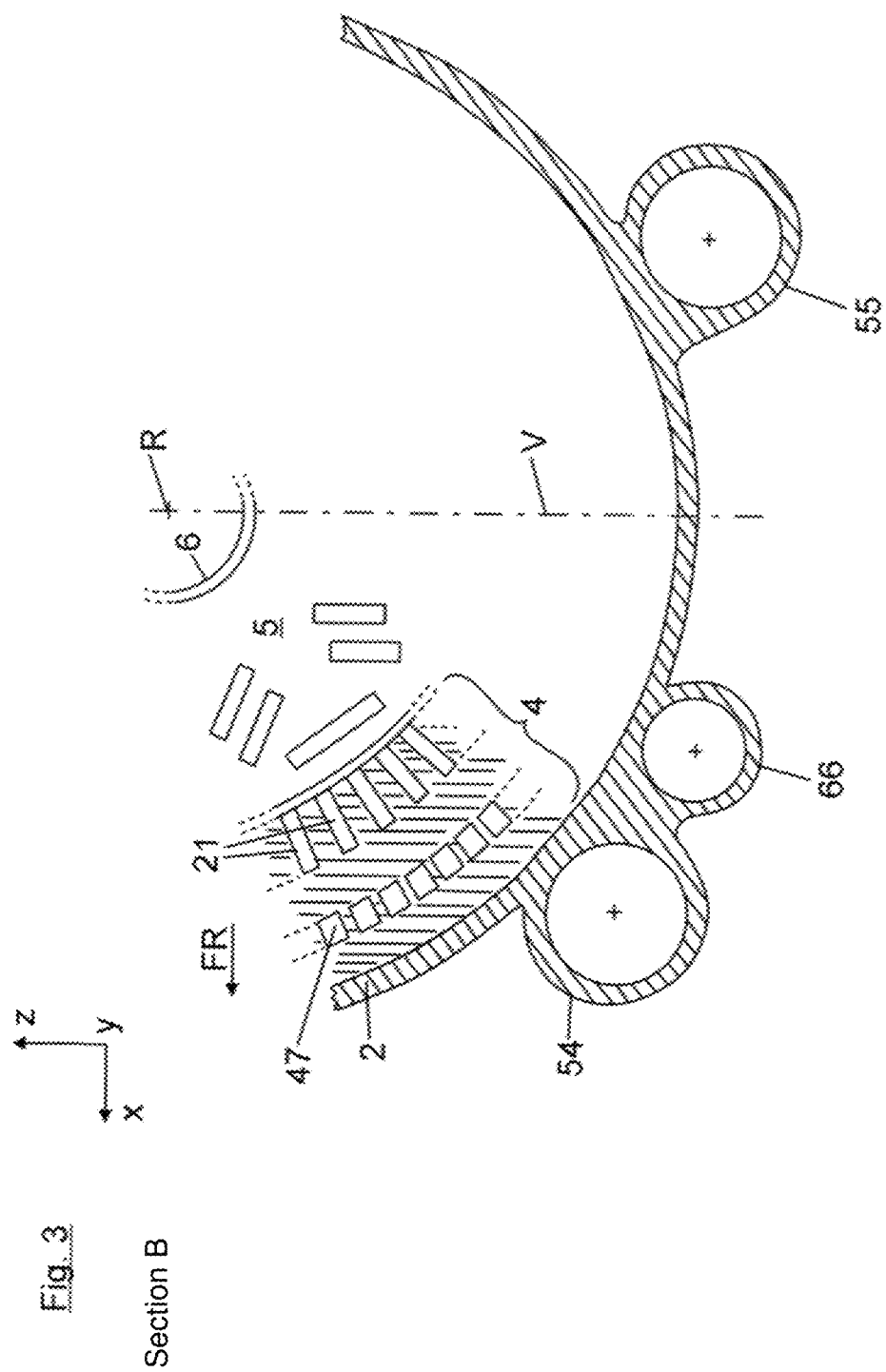
FIG. 3 shows a sectional view of the electric machine.

In order to ensure reliable coolant circulation in different driving operating states, i.e. while cornering and/or uphill driving, it is preferred if the two suction points A1, A2 are positioned in a diagonal arrangement with respect to the rotor axis vertical plane V. For this purpose, the transmission-side suction point A1 and the channel opening 61 of the rear slosh channel 55 as viewed in the direction of travel FR are arranged at the rear and on the left side of the vehicle with respect to the rotor axis vertical plane (FIG. 2). In contrast, the suction point A2 remote from the transmission (i.e. the mouth opening of the return line 66 remote from the transmission) is positioned on the right side of the vehicle and at the front in the direction of travel FR (i.e. with respect to the rotor axis vertical plane V) (FIGS. 1 and 4).

LIST OF REFERENCE NUMERALS 2 stator housing
3 flange shafts
4 stator
5 rotor
6 rotor shaft
8, 9 housing walls
17 transmission input shaft
19 transmission
21 stator windings
27 winding head space
35 coolant tank
37 suction pump
41, 43 coolant supply lines
44 coolant spray rings
45 annular gap
46 nozzles
47 radially outer stator channels
48 coolant passages
49 annular gap
50 coolant passages
51 flow connection
53 radially inner stator channels
54, 55 slosh channels
56 transmission sump
58 transmission return pump
59 electric machine return pump
60 coolant passage
61 channel opening
63 transmission interior
64 sieve element
65 transverse channel
66 return line
67 return line
69 coolant passage
71 electric machine return pump
V rotor axis vertical plane
54, 55 slosh channels
R rotor axis
$h_1$ stator housing height
$h_2$ sloshing channel height
$h_{tot}$ total height
Δz overlap amount
Δx transverse offset
E electric machine hydraulic circuit
G transmission hydraulic circuit
A1 transmission-side suction point
A2 transmission-remote suction point
R rotor axis
V rotor axis vertical plane
Z tooth meshing point

The invention claimed is:
1. A coolant supply system for a drive device of an electrically operated vehicle axle of a vehicle with an electric machine which has a cylindrical stator housing, in which there is a winding head space axially on both sides of a rotor/stator arrangement, at the bottom of which coolant collects, wherein the two winding head spaces are fluidly connected to one another via a coolant sump, and
wherein the stator housing height and the coolant sump height in the electric machine vertical direction add up to a total height, wherein the stator housing height is measured from a suction point defined on a lower internal surface of the stator housing, and wherein, in order to reduce the total height, the coolant sump is offset by a transverse offset from a rotor axis vertical plane, so that the stator housing height and the coolant sump height at least partially overlap in the electric machine vertical direction by an overlap amount, and wherein the electric machine is mounted transversely on the vehicle such that the electric machine extends parallel to the vehicle axle, wherein the coolant sump is divided into two slosh channels, which are arranged with a transverse offset on both sides of the rotor axis vertical plane, and when the vehicle is driving uphill, the rear slosh channel in the direction of travel ensures a fluid connection between winding head spaces due to transverse force, or when the vehicle is driving downhill, the front slosh channel in the direction of travel ensures the fluid connection between the winding head spaces due to transverse force.

2. The coolant supply system according to claim 1, wherein the coolant sump extends continuously in the stator housing axial direction over the entire stator housing axial length.

3. The coolant supply system according to claim 1, wherein an electric machine hydraulic circuit is provided, in which the coolant sump is integrated, from which coolant can be returned at suction points by means of at least one return pump to a coolant tank.

4. The coolant supply system according to claim 1, wherein a first suction point is positioned on one side of the vehicle and a second suction point is positioned on the other side of the vehicle, and when the vehicle is cornering to the left, the coolant in the coolant sump is displaced towards the right suction point due to centrifugal force, or when the vehicle is cornering to the right, the coolant in the coolant sump is displaced towards the left suction point due to centrifugal force, so that the coolant can be safely returned to the coolant tank either at the first or second suction point.

5. The coolant supply system according to claim 4, wherein the first suction point is located close to the transmission, and wherein the second suction point is located remote from the transmission.

6. The coolant supply system according to claim 4, wherein the vehicle is configured to safely return the coolant to the coolant tank during cornering.

7. The coolant supply system according to claim 1, wherein in the drive device, the electric machine drives, via a transmission, flange shafts guided to the vehicle wheels, and a transmission hydraulic circuit is provided, in which a transmission chamber and a transmission sump formed on the transmission bottom are integrated, in which the coolant draining from transmission components collects at a transmission-side suction point, from which the coolant can be returned into the transmission tank with a transmission return pump and the transmission is arranged on a stator housing axial side.

8. The coolant supply system according to claim 7, wherein an end wall of the stator housing close to the transmission has a coolant passage which connects the winding head space close to the transmission with the transmission sump, so that the transmission-side suction point has a dual function, namely not only of sucking out the coolant collecting in the transmission sump, but also of sucking the coolant transferred from the stator housing, and the coolant passage is positioned in vertical alignment with the rotor axis, and/or the sloshing channels are connected to the respective winding head space via coolant passages, and/or at least one of the sloshing channels is connected to the transmission sump via a channel opening.

9. The coolant supply system according to claim 1, wherein the return pumps are arranged on a common stator housing axial side, and the suction point arranged on an axial side remote from the pump is connected via a return line to an electric machine return pump, and/or the slosh channel formed with the channel opening and the transmission-side suction point are positioned on the same side with respect to the rotor axis vertical plane, and/or the suction point remote from the transmission or pump and the sloshing channel which is not connected to the transmission sump are arranged on the opposite side of the rotor axis vertical plane, so that the two suction points are positioned in a diagonal arrangement with respect to the rotor axis vertical plane.

10. The coolant supply system according to claim 1, wherein on a stator housing axial side, a transverse channel is formed, into which the two slosh channels and the return line open, and the transverse channel connects the two slosh channels with one another, and the transverse channel is connected to the winding head space at a coolant passage.

11. The coolant supply system according to claim 10, wherein a sieve element can be inserted into the transverse channel, which element filters the coolant passing through.

12. The coolant supply system according to claim 10, wherein the transverse channel is formed on the stator housing axial side remote from the transmission.

13. A coolant supply system for a drive device of an electrically operated vehicle axle of a vehicle with an electric machine which has a cylindrical stator housing, in which there is a winding head space axially on both sides of a rotor/stator arrangement, at the bottom of which coolant collects, wherein the two winding head spaces are fluidly connected to one another via a coolant sump, and wherein the stator housing height and the coolant sump height in the electric machine vertical direction add up to a total height, wherein the stator housing height is measured from a suction point defined on a lower internal surface of the stator housing, and wherein, in order to reduce the total height, the coolant sump is offset by a transverse offset from a rotor axis vertical plane, so that the stator housing height and the coolant sump height at least partially overlap in the electric machine vertical direction by an overlap amount, wherein an electric machine hydraulic circuit is provided, in which the coolant sump is integrated, from which at suction points coolant can be returned into a coolant tank by means of at least one return pump, wherein the coolant sump is divided into two slosh channels, which are arranged with a transverse offset on both sides of the rotor axis vertical plane, and a transverse channel is formed on a stator housing axial side, in which channel the two sloshing channels open, and the transverse channel connects the two sloshing channels to one another.

* * * * *